United States Patent
Borchers (10) Patent No.: US 8,857,052 B2
(45) Date of Patent: Oct. 14, 2014

(54) METHOD OF FORMING A FLEXURE ASSEMBLY

(75) Inventor: Bruce A. Borchers, Scotts Valley, CA (US)

(73) Assignee: Prysm, Inc., San Jose, CA (US)

( * ) Notice: Subject to any disclaimer, the term of this patent is extended or adjusted under 35 U.S.C. 154(b) by 467 days.

(21) Appl. No.: 13/271,075

(22) Filed: Oct. 11, 2011

(65) Prior Publication Data
US 2013/0088101 A1    Apr. 11, 2013

(51) Int. Cl.
| | |
|---|---|
| *H01R 43/00* | (2006.01) |
| *H02K 23/04* | (2006.01) |
| *H02K 1/17* | (2006.01) |
| *B29C 45/14* | (2006.01) |

(52) U.S. Cl.
CPC .......... *B29C 45/14467* (2013.01); *H02K 23/04* (2013.01); *H02K 1/17* (2013.01)
USPC .................................. 29/883; 29/876; 29/884

(58) Field of Classification Search
CPC . G03F 7/70758; G03F 7/70833; G03F 7/709; F16C 11/12; F16C 11/04; F16C 2220/04; F16C 2300/02
USPC ........... 29/883, 876, 882, 884; 248/560, 619; 310/38, 48, 208
See application file for complete search history.

(56) References Cited

U.S. PATENT DOCUMENTS

| | | | |
|---|---|---|---|
| 3,465,997 A | * | 9/1969 | Piske ............................ 248/619 |
| 8,130,436 B2 | | 3/2012 | Borchers |
| 8,274,724 B2 | | 9/2012 | Borchers et al. |
| 8,582,191 B2 | | 11/2013 | Borchers et al. |
| 8,593,711 B2 | | 11/2013 | Borchers et al. |
| 2009/0064808 A1 | * | 3/2009 | Parison et al. ................... 74/1 R |

* cited by examiner

*Primary Examiner* — Thiem Phan
(74) *Attorney, Agent, or Firm* — Patterson & Sheridan, LLP (57) ABSTRACT

A flexure assembly includes two metallic flexure arrays molded into a thermoplastic support base. The two flexure arrays are positioned in parallel in the thermoplastic support base to allow rotational movement about one axis while providing high stiffness with respect to off-axis movement. Flexible supports in the two flexure arrays may be interleaved to form a cross flexure configuration. Off-axis stiffness of the flexure assembly prevents harmonic resonance in directions that cannot be compensated for in a single-axis actuator.

10 Claims, 7 Drawing Sheets

METHOD OF FORMING A FLEXURE ASSEMBLY

BACKGROUND OF THE INVENTION

1. Field of the Invention

Embodiments of the present invention relate generally to actuators and, more specifically, to a precision molded flexure assembly for a rotational actuator.

2. Description of the Related Art

Actuators are devices configured to cause motion or movement of a component of an apparatus. To allow constrained relative motion between two or more parts, actuators typically include an application-specific bearing. For applications in which closely-controlled actuator movement is desired, bearings may have a high-precision configuration that includes precisely machined parts. For example, high-tolerance ball bearings or bushings are commonly used when precise actuator motion is desired. However, when such an application also requires very long life and small range of motion, the use of bearings can be problematic. Specifically, high-tolerance ball bearings or bushings are generally suited for limited-life applications rather than long-life applications. This is particularly true when the range of motion of the actuator is limited to a very small rotation or translation; small movements are known to grind a ball into the same location on a bearing race and erode material. This highly localized wear quickly decreases the tight dimensional tolerances of the bearing, rendering it unusable for long-life and/or very-high-cycle applications.

As the foregoing illustrates, there is a need in the art for a precision bearing having very long life when actuated over a small range of motion.

SUMMARY OF THE INVENTION

Embodiments of the present invention set forth a flexure assembly that includes two metallic flexure arrays molded into a thermoplastic support base and a method of forming the same. The two flexure arrays are positioned in parallel in the thermoplastic support base to allow rotational movement about one axis while providing high stiffness with respect to off-axis movement. Flexible supports in the two flexure arrays may be interleaved to form a cross flexure configuration.

One advantage of the present invention is a high-precision, low-cost flexure assembly suitable for positioning a component for essentially unlimited cycles. In addition, off-axis stiffness of the flexure assembly prevents harmonic resonance in directions that cannot be compensated for in a single-axis actuator.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

For clarity, identical reference numbers have been used, where applicable, to designate identical elements that are common between figures. It is contemplated that features of one embodiment may be incorporated in other embodiments without further recitation.

DETAILED DESCRIPTION

Figure 1:
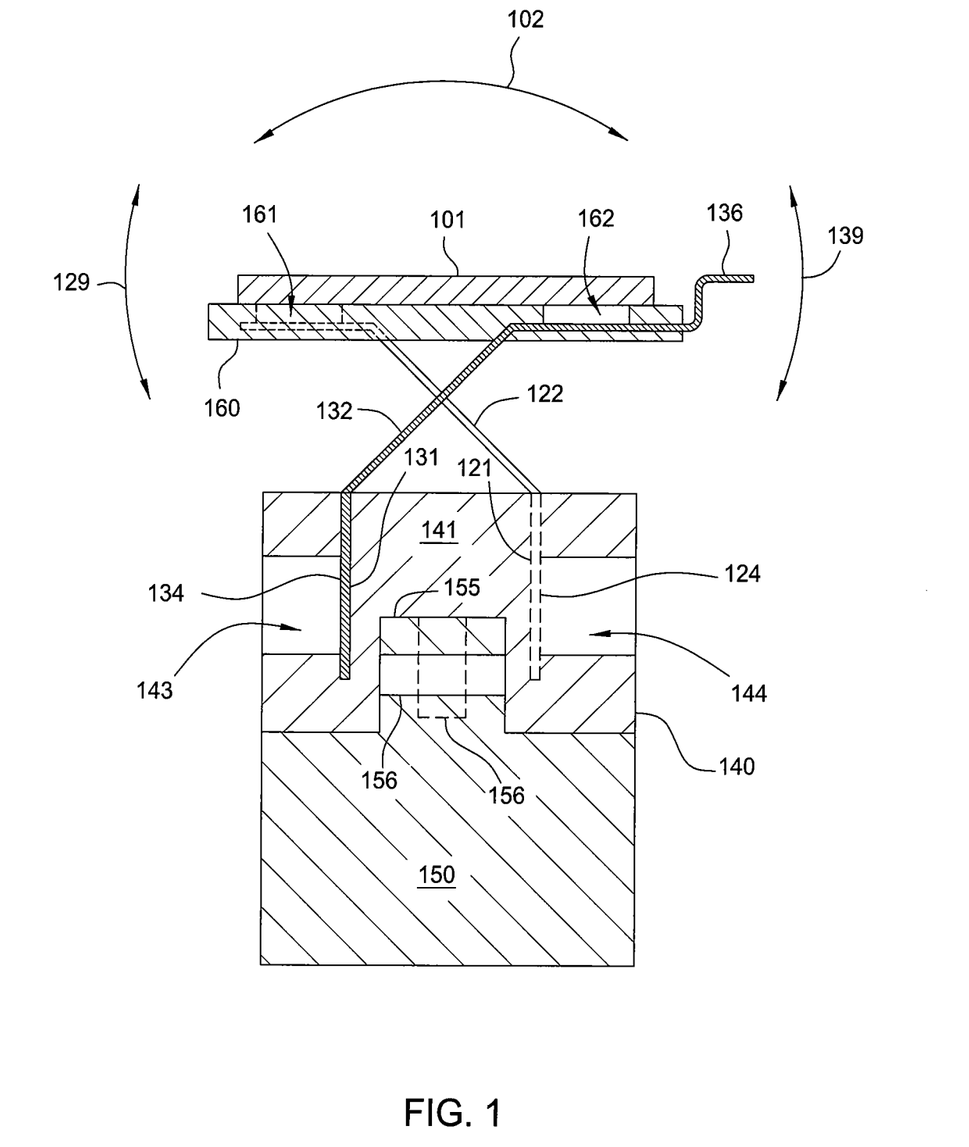
FIG. 1 is a schematic cross-sectional view of a flexure assembly, according to embodiments of the invention.
Figure 2:
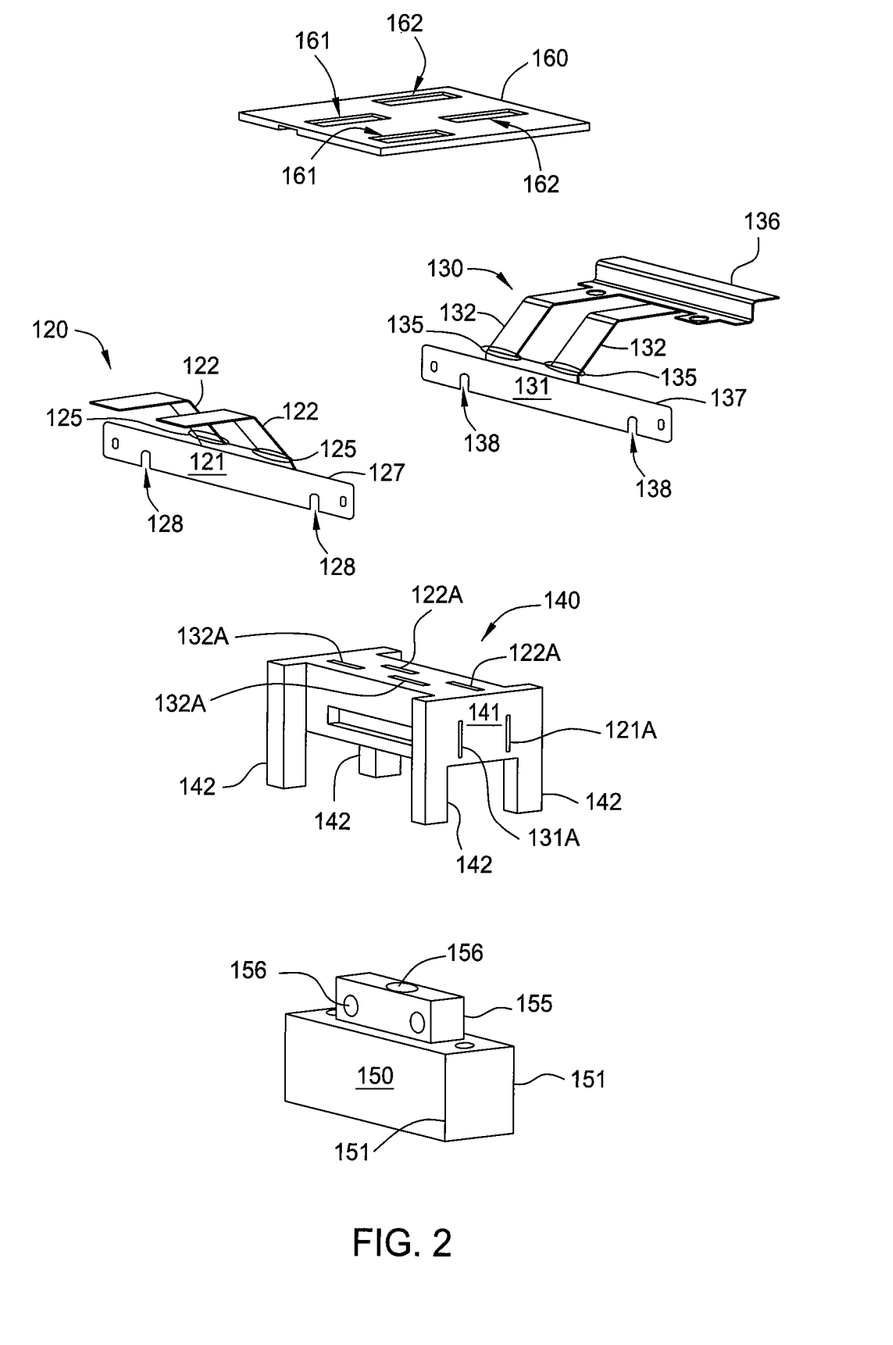
FIG. 2 is a perspective exploded view of the flexure assembly illustrated in FIG. 1.

FIG. 1 is a schematic cross-sectional view of a flexure assembly 100, according to embodiments of the invention. FIG. 2 is a perspective exploded view of flexure assembly 100. Flexure assembly 100 is configured to support and precisely position a position-sensitive device 101, and includes flexure arrays 120 and 130, a support base 140, and a rigid base element 150. In some embodiments, flexure assembly further includes a top molding 160. Flexure assembly 100 permits rotational and/or pivotal motion of position-sensitive device 101 about an axis within a limited range while preventing off-axis motion of position-sensitive device 101. Flexure assembly 100 is therefore configured to facilitate high-speed, precise direction control of position-sensitive device 101 about one axis of rotation. In the embodiment of flexure assembly 100 illustrated in FIG. 1, the rotational or pivotal motion of position-sensitive device 100 is indicated by arrow 102.

Position-sensitive device 101 is a component or element of an apparatus that uses rotational or pivotal motion of position-sensitive device 100 during normal operation. In some embodiments, position-sensitive device 100 is a mirror or other optical element that is positioned on flexure assembly 100 in order to direct one or more laser beams along a desired path. For example, in a laser-based display device, precise and rapid repositioning of position-sensitive device 101 can be used to rapidly direct laser beams alternately along two or more different optical paths in a periodic fashion. Repositioning position-sensitive device 101 hundreds of times per second in such a display device translates into tens of millions of cycles per day, and billions or more cycles over the lifetime of the display device. In other embodiments, position-sensitive device 101 may be a read/write head for a disk drive, a pickup for an optical drive, or any other device that undergoes tightly controlled displacements in a long-life application.

Flexure array 120 is formed from a single metallic sheet and includes a base member 121 and multiple flexible supports 122 attached to base member 121. Flexible supports 122 and base member 121, viewed edge-on in FIG. 1, are shown more clearly in FIG. 2. Flexible supports 122 are attached to base member 121 at a linear attachment region 125 and are configured to deflect easily about one axis of rotation. Specifically, because flexible supports 122 are formed from a relatively thin sheet, flexible supports 122 deflect rotationally about linear attachment regions 125 with little applied force; linear attachment regions 125 act as origins of deflection for flexible supports 122 and as an axes of rotation about which end points 126 of flexible supports 122 rotate. In FIG. 1, the axis of rotation defined by linear attachment regions 125 is out of the page, and the rotational deflection of flexible supports 122 about each linear attachment region 125 is in the plane of the page, as indicated by arrow 129. In contrast, substantially more force is required to deflect flexible supports 122 out of the plane of the page, since flexible supports are constrained in other directions by linear attachment region 125. In addition, the substantially rectangular cross section of flexible supports 122 further discourages out-of-plane deflection. Furthermore, flexure array 120 includes multiple flexible supports 122, and the linear attachment region 125 of each flexible support 122 is aligned along one axis, i.e., the top edge 127 of base member 121. Consequently, out-of-axis deflection of flexible supports 122 is further discouraged, such as torsion or other unwanted deflection besides that indicated by arrow 129. The above-described features of flexible supports 122 provide low-force deflection thereof in a desired direction, i.e., "on-axis," and significantly greater rigidity with respect to off-axis deflection.

Flexure array 130 is substantially similar in configuration to flexure array 120, and includes a base member 131 and multiple flexible supports 132 attached to base member 131. Flexible supports 132 are attached to base member 131 at a linear attachment region 135, and are each configured to deflect easily about one axis of rotation, the deflection being indicated by arrow 139 in FIG. 1. Each of linear attachment regions 135 acts as an origin of deflection for one of flexible supports 132 in the same way that each of linear attachment regions 125 acts as an origin of deflection for a flexible support 122 in flexure array 120. Further out-of-axis deflection of flexible supports 132 is discouraged by the alignment of each linear attachment region 135 of each flexible support 132 along a single axis, i.e., the top edge 137 of base member 131. Thus, similar to flexible supports 122, flexible supports 132 are subject to low-force deflection in a specific desired direction and have significantly greater rigidity with respect to off-axis deflection.

In some embodiments, flexure array 130 includes a charge plate 136 that, when an appropriate charge is applied thereto, can be used to provide position feedback for position-sensitive device 101 during operation of flexure assembly 100. In such embodiments, charge plate 136 is a moving charge plate for a capacitive displacement sensor, a non-contact device capable of high-resolution measurement of the position and/or change of position of a conductive target. Charge plate 136 is a feature that can be formed when flexible supports 132 and other features of flexure array are formed.

In some embodiments, flexure arrays 120, 130 are formed from a material having an endurance limit, e.g., a titanium-containing alloy or a steel material. An endurance limit, as defined herein, is the maximum amplitude or range of cyclic stress that can be applied to the material that will never result in fatigue failure, regardless of number of cycles. It is noted that very few materials have an endurance limit, including ferrous alloys and titanium alloys; most materials are eventually subject to fatigue failure, even with very low cyclic stresses. In such embodiments, flexure assembly 100 is preferably configured such that deflections of flexible supports 122, 132 do not produce stresses that exceed the endurance limit of the material making up flexible supports 122, 132. When so configured, flexible supports 122, 132 of flexure assembly 100 can undergo essentially unlimited cycles without suffering fatigue failure. Consequently, flexure assembly 100 is suitable for the small displacement, very-high-cycle applications that cannot be accommodated with precision ball bearings. In embodiments of flexure assembly 100 that include charge plate 136, the material of flexible supports 122, 132 is preferably a material having very low magnetic permeability, such as 316 stainless steel. This is to minimize force exerted on charge plate 136 by magnets disposed proximate flexure assembly 100.

Support base 140 is an injection-molded component that holds flexure array 120 and flexure array 130 in place and precisely positioned with respect to each other. Flexure array 120 and flexure array 130 are held in place by support base 140 so that flexible supports 122 and flexible supports 132 are interleaved with but are not in contact with each other. For example, in embodiments in which flexure assembly 100 is used to actuate relatively small displacements of position-sensitive device 101, flexure array 120 and flexure array 130 may be held in place by support base 140 with a clearance between flexible supports 122 and flexible supports 132 on the order of 10 s of microns. Because support base 140 is injection-molded around base member 121 of flexure array 120 and base member 131 of flexure array 130, such tight clearances can be readily achieved, even in a high-volume manufacturing environment. A method of forming flexure assembly 100 with such narrow clearance between flexible supports 122 and flexible supports 132 is described below in conjunction with FIG. 6. Larger clearances between flexible supports 122 and flexible supports 132 reduce the potential for mechanical interference therebetween and are also contemplated by embodiments of the invention, such as in embodiments in which larger displacements of position-sensitive device 101 are desired.

Support base 140 includes a body 141, stiffness supports 142, and base member positioning windows 143, 144. Support base 140 is formed around base members 121, 131 in an injection molding process to integrate flexure arrays 120, 130 with support base 140 into a single discrete component. Body 141 is the central portion of support base 140 that encloses base member 121 of flexure array 120 and base member 131 of flexure array 130. In FIG. 2, slots 121A, 131A indicate the location of base members 121, 131, respectively, after the injection-molding process has formed flexure assembly 100. Similarly, slots 122A in FIG. 2 indicate where flexible supports 122 protrude from support base 140 and slots 132A indicate where flexible supports 132 protrude from support base 140. Stiffness supports 142 extend from support base 140 to provide additional structural rigidity in the connection between support base 140 and rigid base element 150. In particular, stiffness supports 142 provide greater rigidity for configurations of flexure assembly 100 that produce high accelerations of position-sensitive device 101. By extending along sides edges 151 of rigid base element 150, relative motion between support base 140 and rigid base element 150 is minimized. Such relative motion can result from high rotational accelerations of position-sensitive device 101.

Base member positioning windows 143, 144 in support base 140 are formed during the injection molding process as support base 140 is formed around base member 121 and base member 131. For high-precision applications of flexure assembly 100, it is desirable that flexure arrays 120, 130 are precisely located relative to each other and to support base 140 upon completion of the injection molding process. To that end, prior to the injection-molding process, flexure arrays 120, 130 are precisely positioned and held in place in the mold cavity in which support base 140 is formed. Positioning and alignment features of base member 121 and base member 131 and/or surfaces of the injection mold are used to implement the precise positioning of flexure arrays 120, 130 when flexure arrays 120, 130 are placed in the injection mold. In some embodiments, positioning slots 128, 138 are formed in flexure arrays 120, 130, respectively. Positioning slots 128, 138 are configured to mate with appropriately located features of the injection mold that molds flexure arrays 120, 130 and support base 140 into a single assembly. In this way, flexure arrays 120, 130 are positioned within a tight tolerance of a desired location. In some embodiments, one or more surfaces of the injection mold are used to facilitate precise positioning of flexure arrays 120, 130 when placed in the injection mold.

During the injection-molding process, as thermoplastic is forced into the cavity, surfaces of flexure arrays 120, 130 are pressed outward against surfaces of the injection mold, thereby positioning flexure arrays 120, 130 within a tight tolerance of a desired position with respect to support base 140. Consequently, because surfaces of the injection mold are in contact with surfaces of flexure arrays 120, 130 during the injection molding process, support base 140 is formed with base member positioning windows 143, 144 upon completion of the injection-molding process. In the embodiment illustrated in FIGS. 1 and 2, surface 124 of base member 121 is exposed by base member positioning window 143 and surface 134 of base member 131 is exposed by base member positioning window 144. However, base member positioning windows 143, 144 may have different configurations and locations than those shown in FIGS. 1 and 2, without exceeding the scope of the invention. Furthermore, different combinations of base member positioning windows and positioning features may be used without exceeding the scope of the invention.

The injection molding process is well known in the art, and the specific process used for forming support base 140 around base members 121, 131 depends on the particular material selected for support base 140. For example, injection pressures can range into the thousands of psi and hundreds of degrees Celsius. Thousands of different materials are available for use in the injection molding process; most polymers, sometimes referred to as resins, may be used, including all thermoplastics, some thermosets, and some elastomers. The specific material and quantity thereof chosen for support base 140 may be based on the strength and function required for the final part, as well as compatibility with the particular molding process used.

Rigid base element 150 is an attachment structure configured for mounting flexure assembly 100 as desired. In the embodiment illustrated in FIGS. 1 and 2, rigid base element 150 includes a protrusion 155 and mold openings 156 for facilitating a mechanically sound connection between support base 140 and rigid base element 150. During the injection molding process, rigid base element 150 is positioned in the cavity of the injection mold used to form support base 140 around base member 121, base member 131, and rigid base element 150. Thermoplastic is then forced into the cavity and around base members 121, 131, into mold openings 156, and around protrusion 155, thereby rigidly coupling rigid base element 150 to support base 140 and integrating rigid base element with support base 140.

In some applications for flexure assembly 100, the high accelerations associated with rapidly and periodically repositioning position-sensitive device 101 can produce harmonic vibration and other unwanted displacements of flexure assembly 100. Consequently, in some embodiments, rigid base element 150 is formed from a very rigid material, such as a metal or metal-alloy. In such embodiments, the metallic material of rigid base element 150 facilitates the use of threaded fasteners or other robust mechanical attachment means for mounting flexure assembly 100 in a desired position. In some embodiments rigid base element 150 is a machined metal part, while in other embodiments rigid base element 150 is a stamped metal part.

Top molding 160 is a separate molded component of flexure assembly 100 that, in some embodiments, is used as a supporting member for position-sensitive device 101, and is molded around the ends of flexible supports 122 and flexible supports 132. Top molding 160 can be formed concurrently with support base 140 in a single injection-molding process. In such an embodiment, two separate cavities are used, i.e., a top cavity for forming top molding 160 around flexible supports 122, 132, and a bottom cavity for forming support base 140 around base member 121 and base member 131. Alternatively, in some embodiments, flexible supports 122, 132 are coupled directly to position-sensitive device 101.

In some embodiments, top molding 160 includes flexible support positioning windows 161, 162, which are artifacts of the molding process when exact positioning of flexible supports 122, 132 is desired. Specifically, for high-precision applications of flexure assembly 100, it is desirable that flexible supports 122, 132 are precisely located relative to each other and to top molding 160. To that end, prior to the injection-molding process, flexible supports 122, 132 are placed in contact with surfaces of the top cavity used to form top molding 160. Then, as thermoplastic is forced into the cavity, surfaces of flexible supports 122, 132 are pressed outward against surfaces of the injection mold top cavity, thereby positioning flexible supports 122, 132 within a tight tolerance of a desired position with respect to top molding 160. Consequently, because surfaces of the top cavity of the injection mold are in contact with surfaces of flexible supports 122, 132 during the injection molding process, top mold 160 is formed with flexible support positioning windows 161, 162 upon completion of the injection-molding process.

The specific thermoplastics used for support base 140 and top mold 160 may vary depending on the specific application for flexure assembly 100. For instance, the thermoplastics used for support base 140 and top mold 160 may be selected depending on the material properties desired for support base 140 and top mold 160 for operation of flexure assembly 100 without unwanted deflection, vibration, etc. Examples of such material properties include tensile and/or flexural moduli of elasticity, Rockwell or Brinell hardness, tensile and/or flexural strength, deflection temperature, and the like. Target material properties for support base 140 and top mold 160 can be readily determined by one of skill in the art based on the shape and mass of position-sensitive device 101, the magnitude of accelerations intended for position-sensitive device 101, and minimum acceptable post-move stability of flexure assembly 100.

Figure 3:
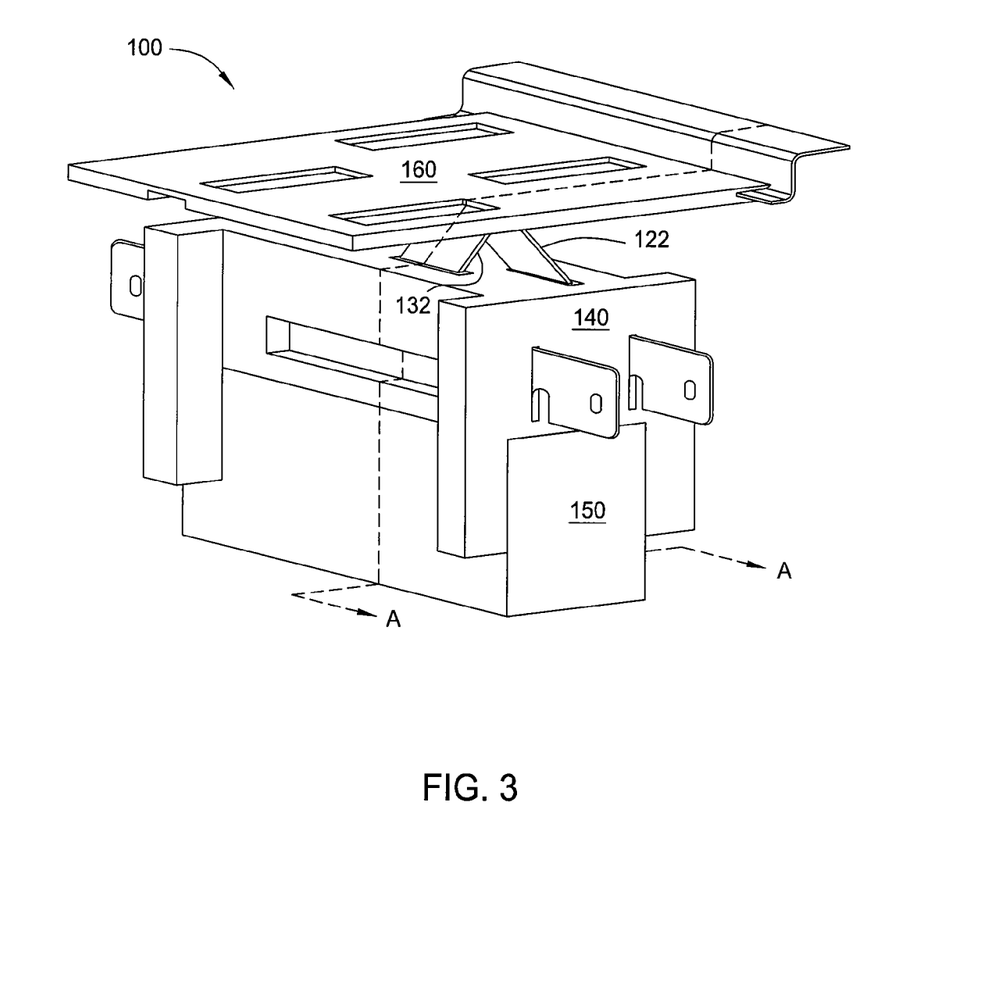
FIG. 3 illustrates a perspective view of a flexure assembly when assembled, according to an embodiment of the invention.
Figure 4:
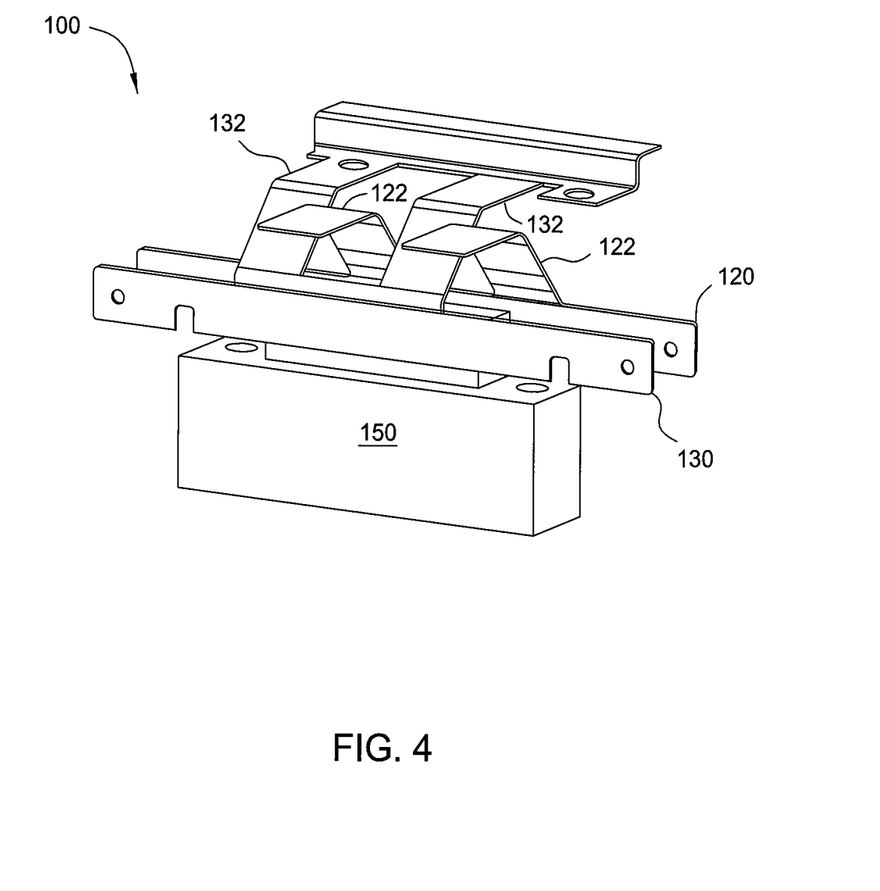
FIG. 4 illustrates another perspective view of a flexure assembly when assembled, according to an embodiment of the invention.

FIG. 3 illustrates a perspective view of flexure assembly 100 when assembled, according to an embodiment of the invention. For reference, section A-A in FIG. 2 indicates the location of the cross-sectional view illustrated in FIG. 1. FIG. 4 illustrates another perspective view of flexure assembly 100 when assembled, according to an embodiment of the invention. For clarity, support base 140 and top mold 160 are omitted in FIG. 4 to more clearly illustrate the interleaving of flexible supports 122 of flexure array 120 with flexible supports 132 of flexure array 130. In the embodiment illustrated in FIG. 4, flexible supports 122, 132 are interleaved to form a cross flexure configuration.

In operation, flexure assembly 100 actuates the position of position-sensitive device 101 rotationally about a single axis. As noted above, due to their linear configuration, flexure array 120 and flexure array 130 are each subject to low-force deflection about the single axis, while having significantly greater rigidity with respect to off-axis deflection. In addition, because flexure array 120 and flexure array 130 are each aligned parallel to each other, off-axis rigidity of flexure assembly 100 further increased. Thus, due to such high off-axis rigidity and on-axis flexibility, in some embodiments, the force required to actuate flexure array 100 in an off-axis direction is on the order of 1000 times the force required to actuate flexure array 100 in the on-axis direction. In some embodiments, a mechanical actuator can be coupled to top mold 160 for repositioning position-sensitive device 101. In other embodiments, an electromagnetically activated actuator is used to vary the position of top mold 160 and position-sensitive device 101. One such embodiment is illustrated in FIG. 5.

Figure 5:
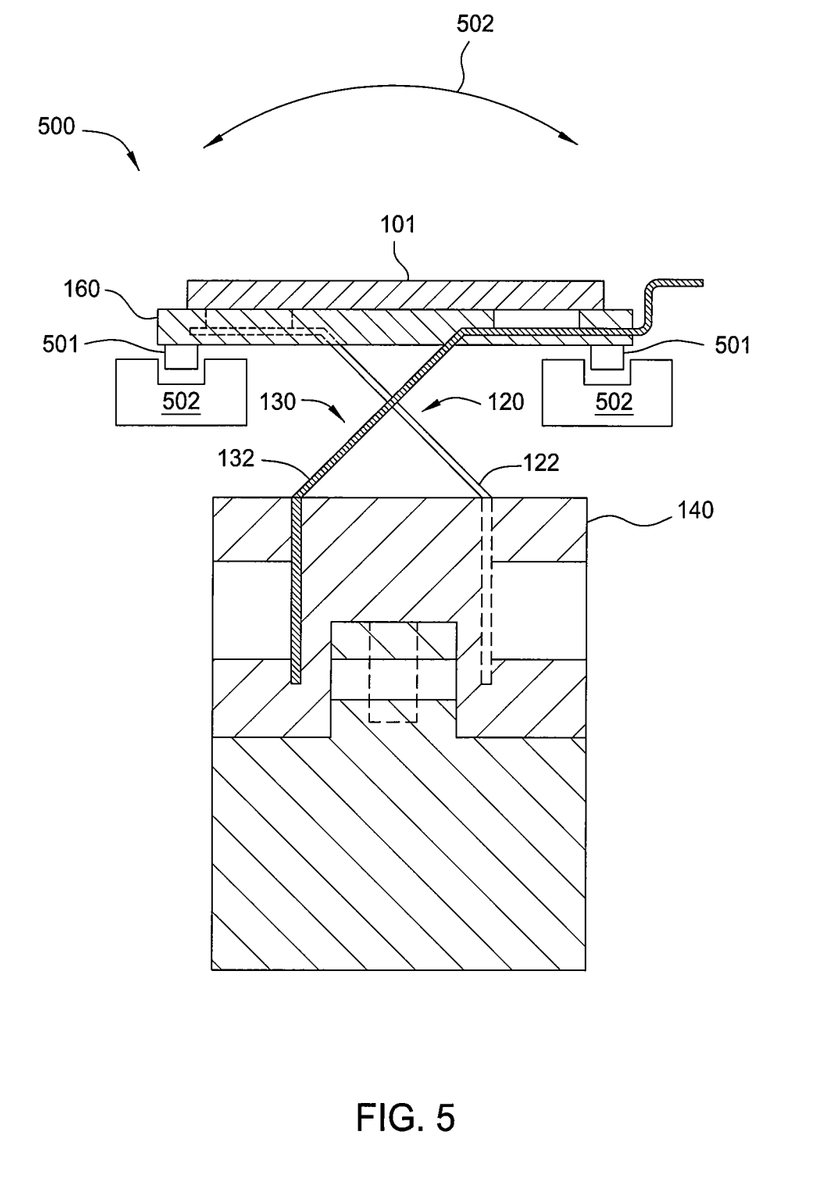
FIG. 5 is a schematic cross-sectional view of a flexure assembly with an electromagnetically activated actuator, according to embodiments of the invention.

FIG. 5 is a schematic cross-sectional view of a flexure assembly 500 with an electromagnetically activated actuator, according to embodiments of the invention. Flexure assembly 500 is substantially similar in organization and operation to flexure assembly 100. Flexure assembly 500 further includes a coil rotor 501 mounted on a surface of top mold 160. Positioned proximate coil rotor 501 is a corresponding magnet stator 502, which is configured to produce a magnetic field with a desired field distribution through coil rotor 501. Current directed through rotor coil 501 exerts an upward force on one side of flexure assembly 500 and a downward force on the opposite side of flexure assembly 500 to rotate top mold 160 and position-sensitive device 101 about a single axis of rotation, as indicated by arrow 502. In some embodiments, flexure array 120 and flexure array 130, which comprise a metallic and therefore electrically conductive material, are used as electrical contacts for providing current to coil rotor 501.

In some embodiments, flexure assembly 500 can be used to periodically and precisely reposition position-sensitive device 101 at a high speed, e.g., hundreds of cycles per second. In such embodiments, the number of rotational cycles actuated by flexure assembly 500 over the life of a device that includes position-sensitive device 101 can be on the order of billions or trillions. One example of such a high-cycle application is a laser-based display device, in which position-sensitive device 101 includes a mirror, lens, or other optical element. One of skill in the art will appreciate that the total number of cycles that can be performed by flexure assembly 500 before fatigue failure of flexible supports 122, 132 occurs is virtually unlimited. This is because a non-contact scheme is used to actuate flexure assembly 500, flexible supports 122, 132 are actuated within the endurance limit of the material thereof, and the components of flexure assembly 500 are robustly held together by an injection-molded component, i.e., support base 140.

In some embodiments, positioning of an optical element or other position-sensitive device using flexure assembly 100 is preferably performed about a single axis, where on-axis stiffness is relatively low and off-axis stiffness relatively high. As noted above, such performance is facilitated with embodiments of the invention. With low resonance in the on-axis direction, the resonant frequency of flexure assembly 100 can be relatively low, so that actuation of flexure assembly 100 does not require high force and excitation of resonance in the on-axis direction can be more easily prevented with a servo control loop. With high off-axis stiffness, off-axis resonant frequencies are relatively high, and are more difficult to excite during operation of flexure assembly 100. In one example embodiment, position-sensitive device 101, top molding 160, and flexible supports 122, 132 make up a suspended mass of approximately 0.32 grams, With an on-axis stiffness of approximately 1000 N/M provided by flexure assembly 100, the on-axis resonant frequency is about 280 Hz. Given an off-axis stiffness that is on the order of about 2000 times greater than the on-axis stiffness, off-axis resonance is proportionately higher, i.e., approximately 12 kHz. Off-axis resonance of such high frequency is generally difficult to excite, resulting in a post-move stability of position-sensitive device 101 of ±0.0006 degrees.

Figure 6:
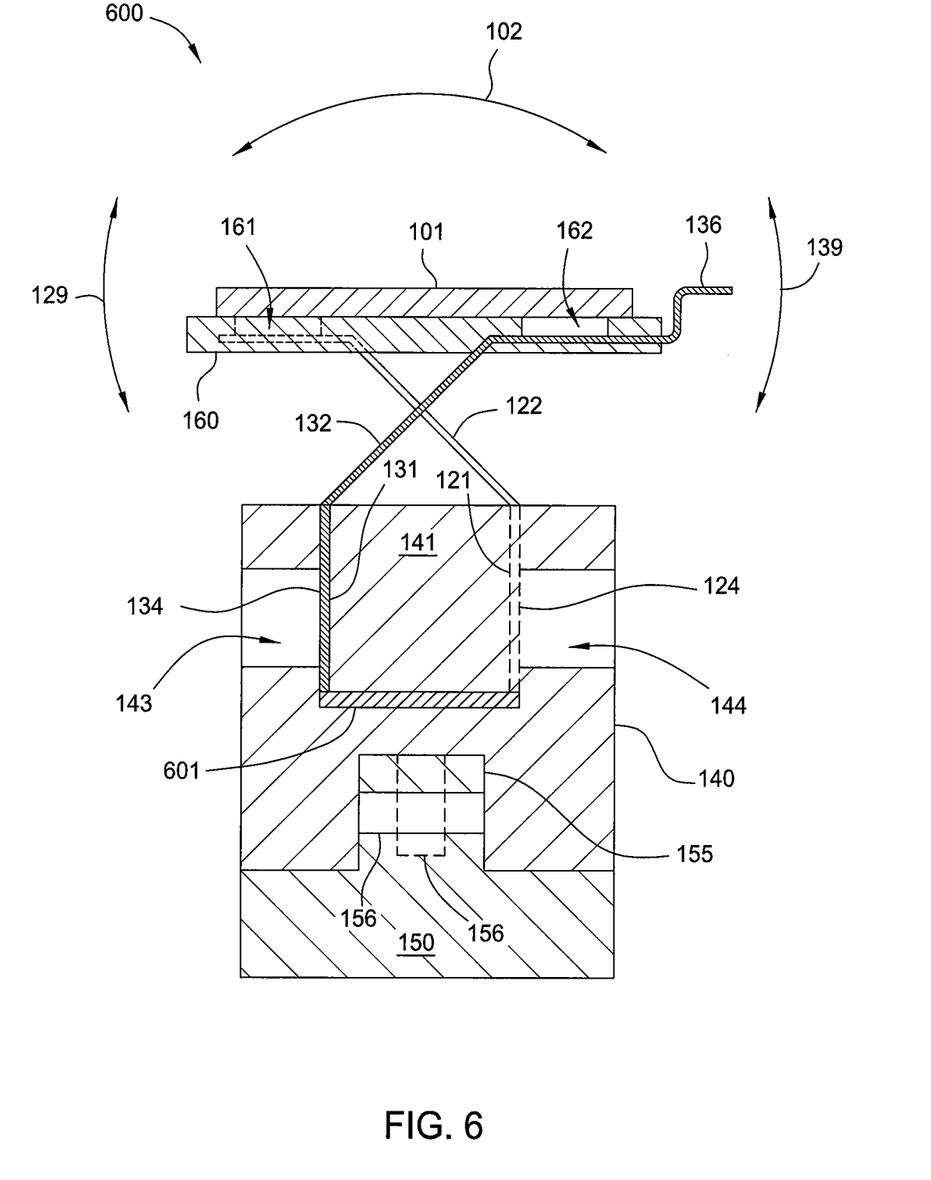
FIG. 6 is a schematic cross-sectional view of a flexure assembly 600 having two flexure two arrays formed from a single metallic sheet, according to embodiments of the invention.

FIG. 6 is a schematic cross-sectional view of a flexure assembly 600 having two flexure two arrays formed from a single metallic sheet, according to embodiments of the invention. As shown, base member 131 is attached to base member 121 via connecting element 601. One of skill in the art will appreciate that two flexure arrays can be formed in such a way using conventional stamping and forming techniques known in the art.

Figure 7:
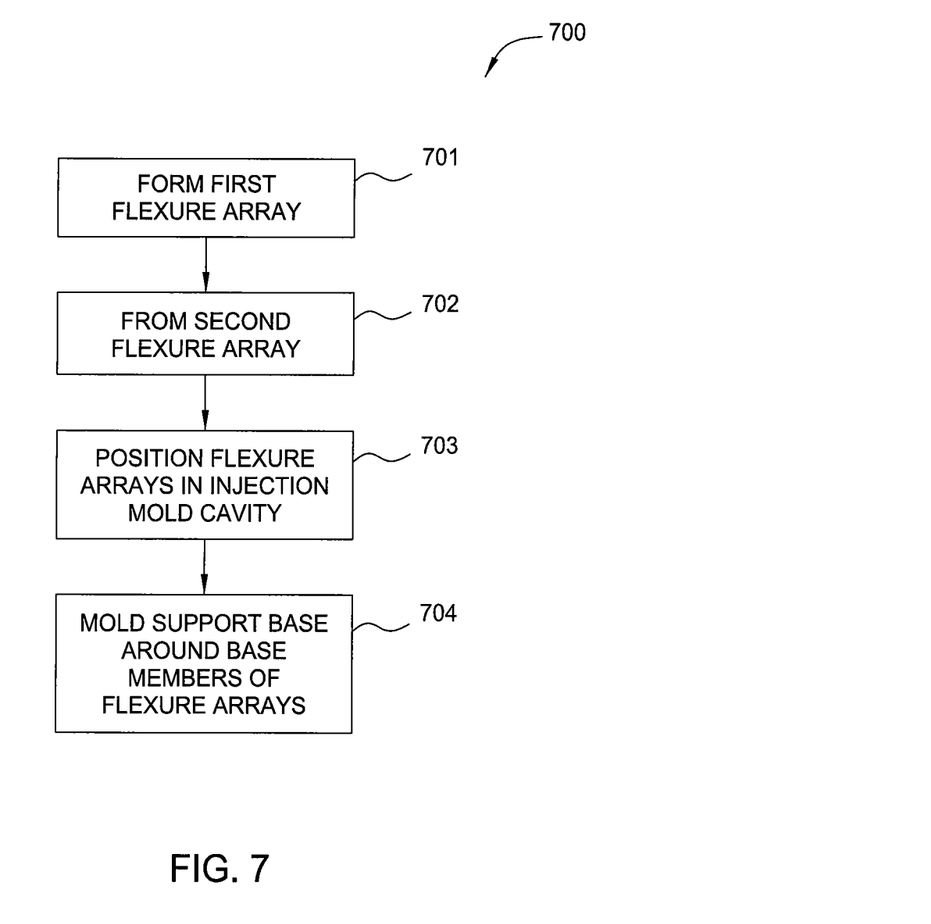
FIG. 7 sets forth a flowchart of method steps for fabricating a flexure assembly, according to embodiments of the invention.

FIG. 7 sets forth a flowchart of method steps for fabricating a flexure assembly, according to embodiments of the invention. Although the method steps are described with respect to flexure assembly 100, persons skilled in the art will understand that performing the method steps to fabricate any similar flexure assembly is within the scope of the invention.

As shown, method 700 begins at step 701, where a first metallic flexure array 120 is formed. Flexure array 120 may be formed by precision stamping from a metallic sheet having an appropriate thickness. Alternatively, flexure array may be formed by photolithographic methods known in the art. For example, an etch mask in the form of a desired geometry for flexure array 120 (or a plurality of flexure arrays 120) is applied to the metallic sheet. The metallic sheet then undergoes a wet etch process in an acid bath to remove all unwanted material from the metallic sheet, leaving a planar configuration of flexure array 120 or a plurality of flexure arrays 120 having all desired features, such as a base member 121, multiple flexible supports 122, and positioning slots 128. Flexure array 120 is formed to its desired, non-planar configuration via a stamping or other forming process known in the art.

In step 702, a second metallic flexure array 130 is formed. Flexure array 130 may be formed using the same processes that formed flexure array 120 in step 701.

In step 703, flexure arrays 120 and 130 are positioned in an injection mold cavity. In some embodiments, a rigid support frame or other rigid base element 150, such as a metallic base element, is also positioned in the injection mold cavity. In some embodiments, the injection mold cavity includes a top cavity for forming top mold 160 onto flexible supports 122, 132 and a bottom cavity for forming support base 140 around base member 121 of flexure array 120 and base member 131 of flexure array 130. In embodiments in which rigid base element 150 is part of flexure assembly 100, the bottom cavity is also used to form support base 140 onto rigid base element 150.

In step 704, a molded support base 140 is formed around base members 121, 131 via an injection-molding process. In some embodiments, top mold 160 is formed concurrently in the separate top cavity of the injection mold. In some embodiments, molded support base 140 is also formed around portions of rigid base element 150. Thus, flexure assembly can be fabricated using a single injection-molding process in which the components of flexure assembly 100 are precisely positioned.

In sum, embodiments of the invention set forth a molded flexure assembly and a method of forming the same. The flexure assembly is advantageously fabricated using an injection-molding process to precisely position elements for the flexure assembly in a robust and easily manufactured configuration. Additional advantages of the invention include a high-precision, ultra-long-life flexure assembly that has high off-axis stiffness, which prevents harmonic resonance in directions that cannot be compensated for in a single-axis actuator.

While the foregoing is directed to embodiments of the present invention, other and further embodiments of the invention may be devised without departing from the basic scope thereof, and the scope thereof is determined by the claims that follow.

I claim:

1. A method of forming a flexure assembly, the method comprising:
   providing a first metallic flexure array that includes a first base member and multiple flexible supports and a second metallic flexure array that includes a second base member and multiple flexible supports;
   positioning the first metallic flexure array and the second metallic flexure array in an injection mold cavity; and
   supplying a thermoplastic into the injection mold cavity to form a molded support base around the first base member and the second base member.

2. The method of claim 1, wherein the first metallic flexure array and the second metallic flexure array are formed by removing material from a steel-containing sheet material.

3. The method of claim 1, wherein the first metallic flexure array and the second metallic flexure array comprise a single component formed from a metallic sheet.

4. The method of claim 1, further comprising:
   prior to supplying a thermoplastic into the injection mold cavity, positioning a bottom support frame in the injection mold cavity, whereby the bottom support frame is integrated with the molded support base when the thermoplastic is supplied.

5. The method of claim 1, further comprising, concurrently with forming the molded support base around the first base member and the second base member, forming a molded component that couples the multiple flexible supports in the first metallic flexure array to the multiple flexible supports in the second metallic flexure array.

6. The method of claim 1, wherein positioning the first metallic flexure array and the second metallic flexure array in the injection mold cavity comprises interleaving the multiple flexible supports in the first metallic flexure array with the multiple flexible supports in the second metallic flexure array.

7. The method of claim 6, wherein interleaving the multiple flexible supports in the first metallic flexure array with the multiple flexible supports in the second metallic flexure array comprises positioning the flexible supports in the first metallic flexure array within 100 microns of but not in contact with flexible supports in the second metallic flexure array.

8. The method of claim 1, wherein a thickness of the steel-containing sheet material is selected so that flexion of the multiple flexible supports in normal operation of the flexure assembly produces an internal stress in the steel-containing material that does not exceed an endurance limit of the steel-containing sheet material.

9. The method of claim 1, wherein positioning the first metallic flexure array and the second metallic flexure array in an injection mold cavity comprises contacting an interior surface of the injection mold cavity with the first metallic flexure array and contacting another interior surface of the injection mold cavity with the second metallic flexure array.

10. The method of claim 9, wherein positioning the first metallic flexure array and the second metallic flexure array in an injection mold cavity further comprises mating an alignment feature of the first metallic flexure array or the second metallic flexure array with a corresponding feature associated with the injection mold cavity.

* * * * *